United States Patent [19]

Gratton

[11] Patent Number: 5,129,215
[45] Date of Patent: Jul. 14, 1992

[54] METHOD AND MEANS FOR WRAPPING BALES OF HAY

[76] Inventor: Robert E. Gratton, 119 N. Water St., West Newton, Pa. 15089

[21] Appl. No.: 587,959

[22] Filed: Sep. 25, 1990

[51] Int. Cl.$^5$ ............................................. B65B 11/04
[52] U.S. Cl. ....................................... 53/587; 53/118; 53/211
[58] Field of Search ................ 53/118, 211, 587, 556; 414/24.5, 24.6, 546

[56] References Cited

U.S. PATENT DOCUMENTS

| | | | |
|---|---|---|---|
| 4,042,140 | 8/1977 | McFarland | 414/24.5 |
| 4,248,561 | 2/1981 | Graves | 414/24.5 |
| 4,343,132 | 8/1982 | Lawless | 53/211 X |
| 4,508,359 | 4/1985 | Campbeu | 414/24.5 |
| 4,578,008 | 3/1986 | Gleason | 414/24.5 |
| 4,594,041 | 6/1986 | Hostetter | 414/24.5 |
| 4,641,484 | 2/1987 | Popelka | 53/587 X |
| 4,662,151 | 5/1987 | Mathes | 53/118 X |
| 4,687,402 | 8/1987 | Zatylny | 414/24.5 X |
| 4,815,369 | 3/1989 | Akins | 53/587 X |

FOREIGN PATENT DOCUMENTS

| | | | |
|---|---|---|---|
| 336739 | 10/1989 | European Pat. Off. | 53/587 |
| 2159489 | 12/1985 | United Kingdom | 53/211 |

*Primary Examiner*—John Sipos
*Attorney, Agent, or Firm*—Zarley, McKee, Thomte, Voorhees, & Sease

[57] ABSTRACT

A hay bale wrapping machine having a platform having a forward end, opposite forward corners, opposite sides and a rearward end. Support wheels are located on opposite sides of the platform. A bale wrapping unit is mounted on the platform. A pair of arms are pivotally secured to the forward end of the platform and are connected to a power unit for pivoting the arms from a forwardly extending position to an upwardly and rearwardly position to permit a bale of hay secured between the arms to be lifted over the front end of the platform for operative positioning on the bale wrapping unit. A hydraulic unit connected to the arms permits them to be moved towards and away from each other for grasping and releasing, respectively, a bale. A tongue unit is pivotally secured to the side of the platform, and can be hydraulically moved to an angular position with respect to the direction of travel of the machine. A method of wrapping hay bales by moving the bale wrapping machine in a direction generally along the windrow in which the bales are resting on the ground; approaching the bales with the machine so that the forward end of the platform is generally parallel to the axis of the bale; then lifting the bale over the forward end of the platform and depositing the bale on the bale wrapping unit; and then wrapping the bale with a protective material.

1 Claim, 3 Drawing Sheets

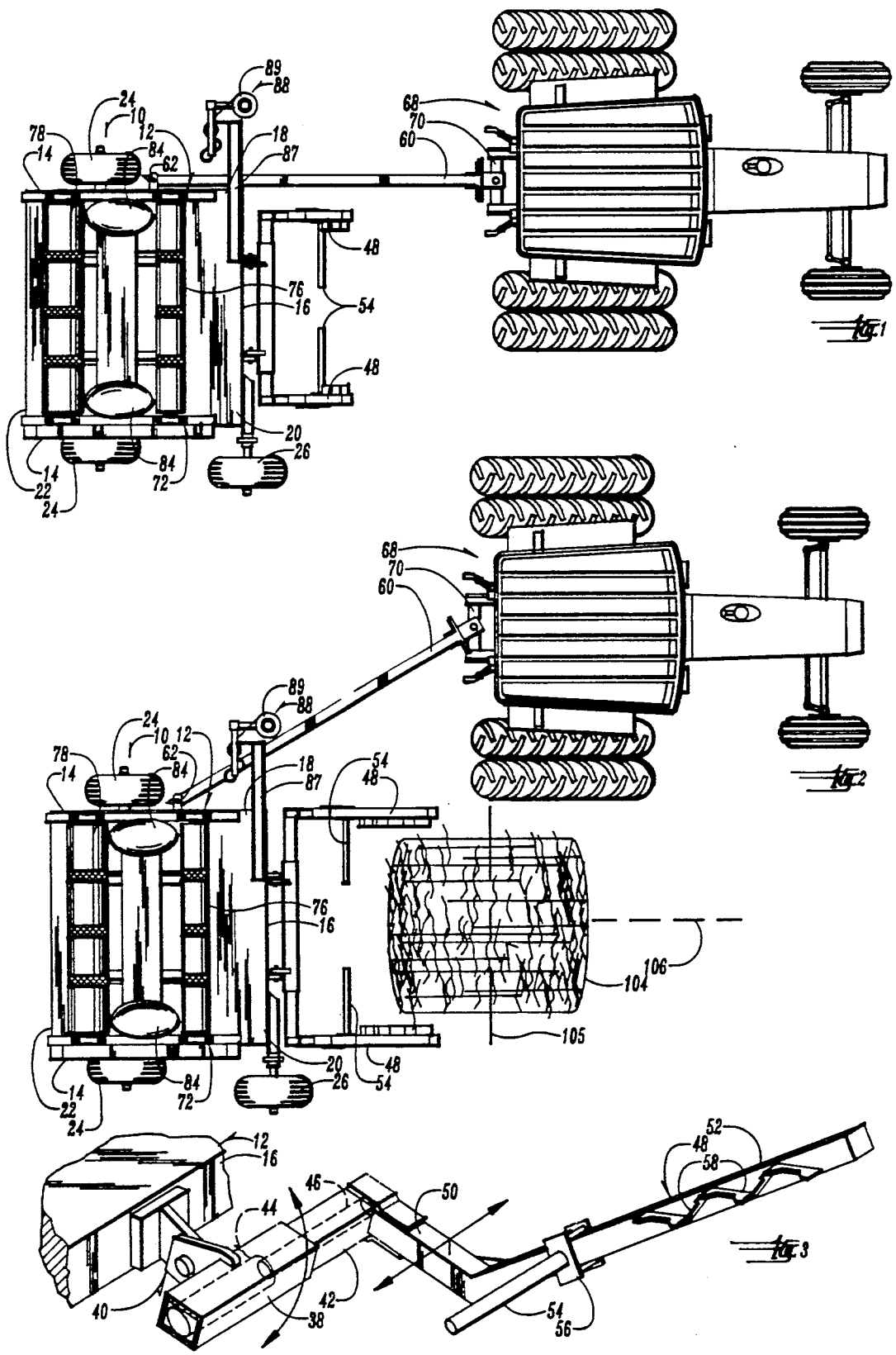

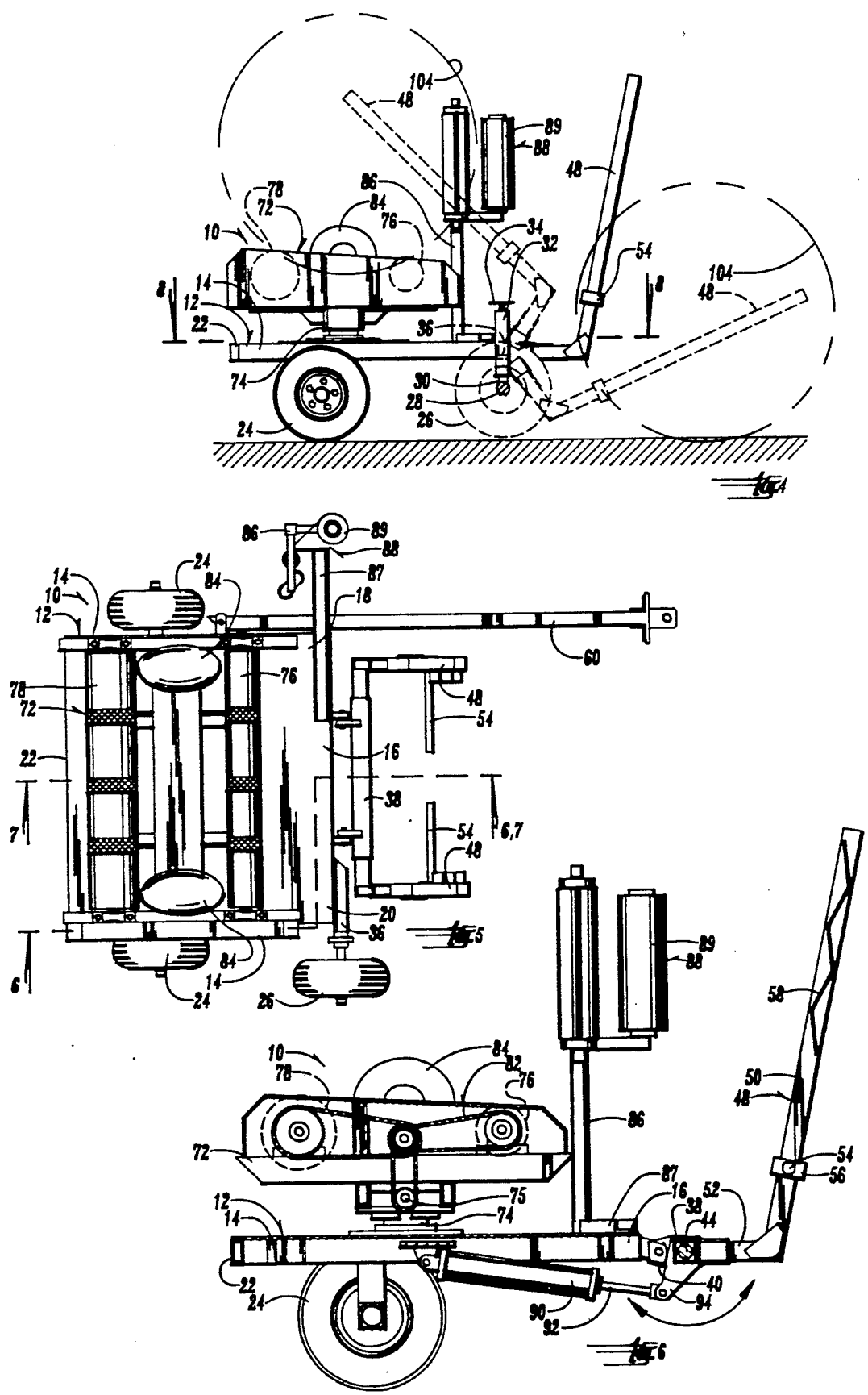

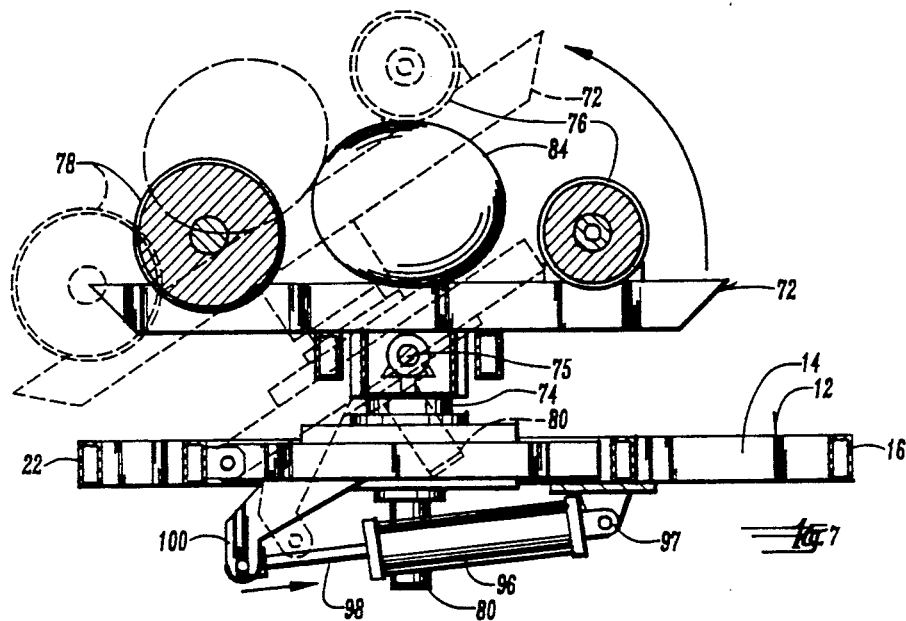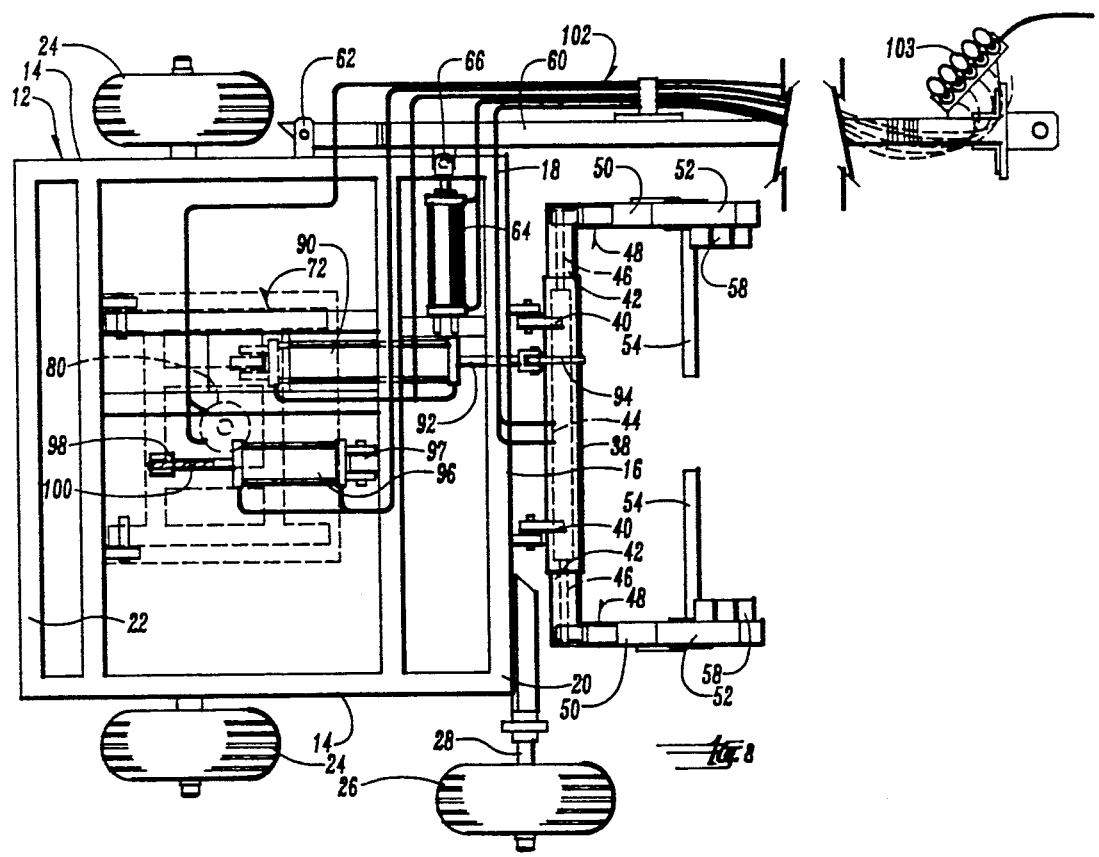

METHOD AND MEANS FOR WRAPPING BALES OF HAY

BACKGROUND OF THE INVENTION

Machines for wrapping large round bales of hay weighing in the order of 1500 pounds or more with layers of plastic film exist in the prior art. Some of these machines have the ability to pick up such a bale from a side position, deposit the bale on a bale wrapping turntable, wrapping the bale in plastic film, and then depositing the wrapped bale back onto the ground surface.

These side-loading bale wrapping machines have several shortcomings. First of all, a counter weight mechanism is required to be used on such machines opposite the bale lifting mechanism to counter the substantial weight of the bale as it is being lifted onto the turntable. Further, because of the sideloading mechanism, these machines cannot proceed down the windrow where the bales are deposited, but rather, must be moved at right angles to the windows to accommodate the side-loading mechanism. This requires additional time and inconvenience in positioning the machine adjacent the bales by crossing sequentially from one windrow to another.

It is therefore a principal object of this invention to provide a bale wrapping machine which can lift the bale to be wrapped over the forward edge of the machine rather than the side edge.

A further object of this invention is to provide a bale wrapping machine which can successfully sequentially wrap a plurality of bales deposited along an elongated windrow along which a plurality of bales are resting on the ground.

A still further object of this invention is to provide a bale wrapping machine which does not require any counter weights to balance the machine while the bale is being lifted onto the machine.

A still further object of this invention is to provide a bale wrapping machine which has an offset tongue for towing purposes to free the forward portion of the machine for the bale loading procedure.

These and other objects will be apparent to those skilled in the art.

SUMMARY OF THE INVENTION

The hay bale wrapping machine of this invention includes a platform having a forward end, opposite forward corners, opposite sides and a rearward end. Support wheels are located on opposite sides of the platform. A bale wrapping means is mounted on the platform. A pair of arms are pivotally secured to the forward end of the platform and are connected to power means for pivoting the arms from a forwardly extending position to an upwardly and rearwardly position to permit a bale of hay secured between the arms to be lifted over the front end of the platform for operative positioning on the bale wrapping means. Hydraulic means connected to the arms permits them to be moved towards and away from each other for grasping and releasing, respectively, a bale. A tongue means is pivotally secured to the side of the platform, and can be hydraulically moved to an angular position with respect to the direction of travel of the machine.

The method of the invention involves moving the bale wrapping machine in a direction generally along the windrow in which the bales are resting on the ground; approaching the bales with the machine so that the forward end of the platform is generally parallel to the axis of the bale; then lifting the bale over the forward end of the platform and depositing the bale on the bale wrapping means and then wrapping the bale with a protective material.

BRIEF DESCRIPTION OF THE DRAWINGS

FIG. 1 is a plan view of the machine of this invention secured to a conventional farm tractor;

FIG. 2 is a plan view similar to that of FIG. 1, but shows the machine in an offset position with respect to the tractor as it is about to grasp a bale to be wrapped;

FIG. 3 is an enlarged scale perspective view of one of the lifting arms of this invention;

FIG. 4 is a side elevational view of the machine of this invention;

FIG. 5 is a plan view of the machine in its travel position;

FIG. 6 is an enlarged scale sectional view taken on line 6—6 of FIG. 5;

FIG. 7 is an enlarged scale sectional view taken on line 7—7 of FIG. 5; and

FIG. 8 is an enlarged scale schematic plan view showing the hydraulic power circuit that controls the various components of the machine.

BRIEF DESCRIPTION OF THE PREFERRED EMBODIMENT

The bale wrapping machine 10 includes a platform 12 having sides 14, forward end 16, forward corners 18 and 20, and a rearward end 22 (see FIG. 1). Wheels 24 are rotatably secured to the substantial mid-point of the sides 14 of platform 12. As best shown in FIGS. 4 and 8, a balancing wheel 26 is rotatably secured to axle 28. The axle 28 is secured to a vertically disposed inner post 30 which is slidably mounted within outer post 32. A conventional screw jack 34 is secured to the inner post 32 to selectively raise or lower the axle, and hence the balancing wheel, to a desired position. A horizontally disposed arm 36 is secured to outer post 32 and is secured by any conventional means to the forward corner 20 of platform 12.

With reference to FIGS. 3 and 8, a hollow square tube 38 is secured by hinge bracket 40 to the forward end 16 of platform 12. A pair of support beams 42 are slidably mounted in the ends of tube 38, with the inner ends thereof being secured to double acting cylinder 44 through the pair of protruding piston rods 46.

Lifting arms 48 comprised of arm portions 50 and 52 extend normally forwardly from the outer ends of support beams 42. Arm portions 50 are welded to the outer ends of support beams 42. Support bars 54 have one of their ends secured to slidable brackets 56. Each of the arms 48 has such a support bar 54, and as shown in FIG. 3, the support bars extend inwardly from the arms 48. The longitudinal position of the bars 48 with respect to the arm portion 52 can be determined by adjusting the position of the slidable bracket 56. Inwardly extending cleats 58 are welded to the inner face of the arm portions 52 for facilitating the grasping of a bale by the arms as will be more fully explained hereafter.

Elongated tongue 60 is pivotally secured to one side of platform 12 by pivotal bracket 62. A hydraulic cylinder 64 (FIG. 8) is secured to platform 12 and is pivotally secured to tongue 60 by pivotal bracket 66. The extension of the conventional piston of hydraulic cylinder 64 causes the tongue 60 to move from the position in FIG.

1 to the angular position of FIG. 2. The forward end of tongue 66 is adapted to be conventionally connected to tractor 68 through its conventional drawbar 70.

The bale wrapping mechanism shown in the drawings does not of itself constitute part of the present invention. The essential parts of the bale wrapping mechanism will be described only to provide a better understanding of the total function of the machine of this invention.

A turntable 72 (FIGS. 6 and 7) is rotatably mounted on post 74 and is adapted to tilt from a horizontal position to a rearwardly inclined position on horizontal axis 75. Rollers 76 and 78 extend transversely across turntable 72 and are adapted to support the bale to be wrapped during the wrapping operation. A hydraulic motor 80 (FIG. 7) is mounted on turntable 72 and is adapted to rotate rollers 76 and 78 through the drive assembly 82 shown in FIG. 6. Inclined disk elements 84 are mounted on turntable 72 to provide lateral support to the bale mounted on the turntable.

Hydraulic motor 80 is secured to turntable 76 and is adapted to rotate the turntable with respect to the platform 12 upon being hydraulically actuated.

The bale wrapping material is supported on vertical post 86 which extends upwardly from arm 87 which is secured to platform 12. A conventional bale covering material dispenser 88 is mounted on post 86 and dispenses the plastic material 89.

With reference to FIGS. 6 and 8, a cylinder 90 is pivotally secured to platform 12 and has a forwardly extending piston 92 which is secured to a bracket 94 which is rigidly secured to tube 38. The extension or retraction of piston 92 with respect to cylinder 90 causes tube 38, and hence arms 48 to rotate by means of the eccentric connection between the pistons and tube 38 provided by bracket 94.

With reference to FIGS. 7 and 8, a further hydraulic cylinder 96 is secured to platform 12 by bracket 97. Piston 98 extends from cylinder 96 and is pivotally secured to bracket 100 which is secured to turntable 72. The retraction of piston 98 causes the horizontal turntable 72 to pivot to the position shown by the dotted lines in FIG. 7, and this causes a wrapped bale mounted on rollers 76 and 78 to slide off of the machine onto the supporting ground surface. A conventional hydraulic circuit 102 (FIG. 8) with appropriate hydraulic controls 103 is operationally connected to each of the cylinders and hydraulic motor 80.

In operation, a conventional round bale 104 having an axis 105 is typically resting on the ground surface along a windrow 106 where a plurality of bales normally would be resting following the baling operation. The hydraulic circuit 102 is actuated as described heretofore to cause cylinder 64 to move tongue 60 from the position shown in FIG. 1 to the position shown in FIG. 2. This permits the tractor 68 to pull the machine 10 down the windrow 106 without the tractor having to interfere or encounter the bales which are resting along the windrow 106.

The machine 10 is then positioned rearwardly of the bale 104, as shown in FIG. 2, and the cylinder 44 is actuated to spread the lifting arms 48 as shown in FIGS. 2 and 8. Cylinder 90 (FIG. 6) is then actuated to move the arms 48 to the lower most position of the arm shown by the dotted lines in FIG. 4.

Balancing wheel 26 is normally in its "travel" position shown in FIG. 4 where it is elevated an inch or so off of the ground surface.

The cylinder 44 is then actuated in an opposite direction to cause the arms 48 to close inwardly and forceably grasp the bale 104 between the arms. The cleats 58 are forcibly moved into the bale. The support bars 54 engage the portion of the outer periphery of the bale as best seen by the position of bracket 56 shown in FIG. 4 when the arms 48 are in their lower most position.

Cylinder 90 (FIG. 6) is then actuated to extend piston 92 to cause arms 48 to move upwardly and rearwardly so that the bale 104 moves from the lower most position shown in FIG. 4, over the front end 16 of platform 12 to the upper most position shown in that figure. The cylinder 44 is then actuated again to cause the arms 48 to move apart from each other to release the bale on the turntable 72. During the lifting operation, the balancing wheel 26 stabilizes the platform 12 by engaging the ground surface whereupon the platform 12 is completely stabilized during the lifting operation by the wheels 24, the balancing wheel 26, and the tongue 60. Substantial stress would be imposed upon platform 12 during the lifting operation if balancing wheel 26 were not present, particularly in view of the offset position of tongue 60.

A free end of plastic material 89 is then pulled from dispenser 88 and secured to the bale 40 by stuffing the end in inner convolution of the bale. Hydraulic motor 80 is then actuated to cause turntable 72 to rotate on post 74. At the same time, rollers 76 and 78 are actuated. The dual rotational motion imposed upon the bale causes the rotating bale to pull plastic material 89 from dispenser 88, and after a predetermined number of revolutions, the bale is completely encased in the material 89. The material 89 coming from dispenser 88 is severed, the cylinder 96 is actuated to tilt the platform 72 rearwardly, and the wrapped bale moves rearwardly from the turntable to a position on the ground surface. Again, the precise structure for wrapping the bales with the material 89 does not constitute the invention herein.

The arms 48 are moved to the position shown by the solid lines in FIGS. 4 and 6 during the bale wrapping operation. It is seen that the structure and method of this invention permit the bale to be loaded over the front end of the platform. This feature, in conjunction with the offset tongue 60, permits the machine to be moved directly along the windrow 106. No counter weights are required for loading the bales over the forward end of the machine. Thus, from the foregoing, it is seen that this invention will accomplish a least its stated objectives.

I claim:

1. A hay bale wrapping machine, comprising,
   a bale wrapping platform having a front transverse edge, opposite forward corners, opposite sides, and are rearward end,
   support wheels on opposite sides of said platform,
   bale wrapping means mounted on said platform,
   a pair of arms pivotally secured to the front transfer edge of said platform,
   first power means secured to said arms for pivoting said arms from a forwardly extending position to an upwardly and rearwardly extending position to permit a bale of hay having a transverse horizontal axis to be secured between said arms and to be lifted over the front transverse edge of said platform for operative positioning on said bale wrapping means with said transverse horizontal axis of said bale remaining in a transverse horizontal orientation, a tongue means secured to and extending forwardly from said platform adjacent one of said forward corners of said platform for attachment to a prime mover so that said bale platform can approach a bale of hay to be wrapped by moving in a forward direction with said prime mover, to permit said bale of hay to be engaged by said pair of arms and to be lifted over said front transverse edge of said platform.

* * * * *